United States Patent [19]

Overmyer

[11] Patent Number: 4,516,110
[45] Date of Patent: May 7, 1985

[54] SKI STRESS SIGNALING DEVICE

[76] Inventor: Mark Overmyer, 3202 Prairie Rd., Rockford, Ill. 61102

[21] Appl. No.: 406,136

[22] Filed: Aug. 9, 1982

[51] Int. Cl.³ .................. G08B 23/00; G08B 21/00; A63B 69/18
[52] U.S. Cl. .................. 340/323 R; 73/862.02; 272/97; 340/665; 434/253
[58] Field of Search .................. 434/253; 272/97; 73/862.02; 340/323 R, 689, 573, 665; 280/818, 809

[56] References Cited

U.S. PATENT DOCUMENTS

| | | | |
|---|---|---|---|
| 3,644,919 | 2/1972 | Mathauser | 434/253 X |
| 3,776,566 | 12/1973 | Smolka | 340/573 X |
| 3,973,333 | 8/1976 | Caris | 434/253 |
| 4,092,787 | 6/1978 | Kaempfen | 434/253 |

Primary Examiner—James J. Groody
Attorney, Agent, or Firm—John H. Calhoun, Jr.

[57] ABSTRACT

A ski stress signaling device comprising a pair of strain gauges mounted on the top surface of each of a pair of skis with one strain gauge in front of the boot and the other strain gauge behind the boot. Each pair of strain gauges is connected by electrical conductor wires to a bridge circuit. The magnitude and polarity of the voltage output of the bridge circuit is determined by the amount of strain measured at the tops of the skis by the four gauges. The amplified output of the bridge circuit is used by a pair of LED (light emitting diode) drivers to control the illumination of two pluralities of LEDs mounted around the periphery of a pair of goggles worn by the skier. When a skier leans forward causing compressive stress to be applied to the fronts of his skis one or more of the LEDs in one of the goggles is illuminated, with the number of illuminated LEDs being proportional to the magnitude of the stress difference between the fronts of the skis and the backs of the skis resulting from the forward pitch of the skier. When a skier leans backwards the resulting stress imbalance produces a like signal in the other goggle. A skier is able to observe with his peripheral vision which, if any, LEDs are illuminated and adjust his position on his skis to produce a desired stress imbalance, such as may be required for making a turn, or to eliminate an undesired stress imbalance, all without taking his eyes off the ski path.

3 Claims, 6 Drawing Figures

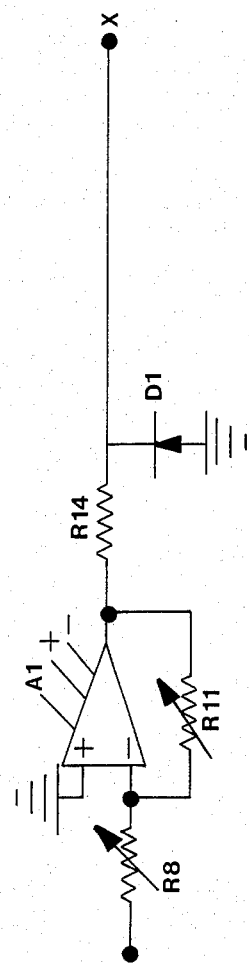
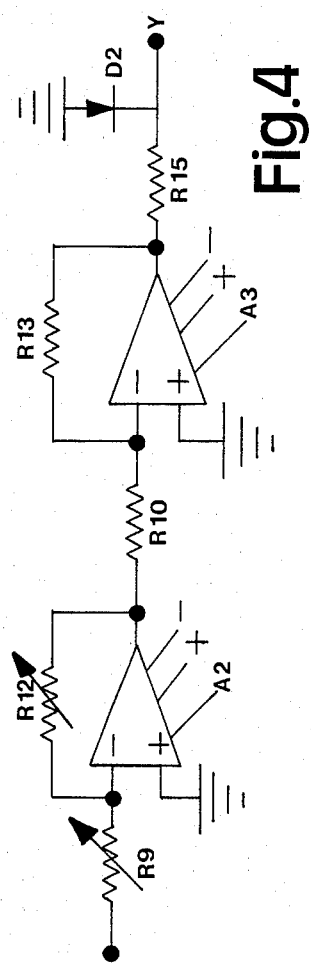
Fig.4
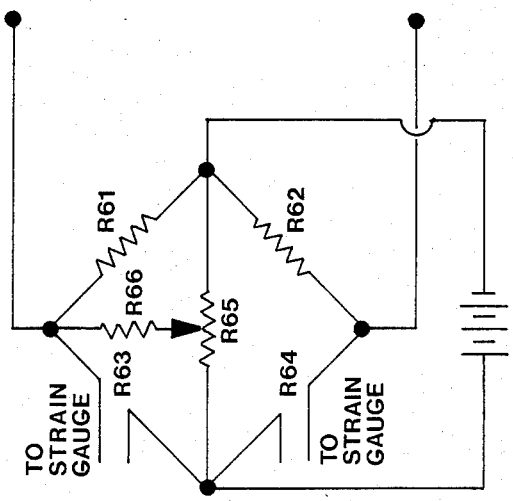
Fig.6
Fig.3

SKI STRESS SIGNALING DEVICE

BACKGROUND OF THE INVENTION

Devices for training or assisting a skier to maintain a proper balance on his skis are known in the art. U.S. Pat. No. 3,644,919 issued on Feb. 22, 1972 to William R. Mathauser shows a signaling device for indicating improper position of a skier. The Mathauser device comprises either a pair of pressure sensitive switches mounted inside the ski boots between the upper front surface of the foot and ankle and the front of the boots or a switch unit worn at the knee of a skier. In either case, the purpose of the switch means is to provide a signal to a skier when his knees are not properly bent. U.S. Pat. No. 3,973,333 issued on Aug. 10, 1976 to Barry M. Caris shows a snow ski training device comprising a pair of straps, one connected to each of a skier's legs just above the knee, with a releasable connection therebetween. The device provides a sensation, such as a popping noise when the skier's knees are moved apart. U.S. Pat. No. 3,776,566 issued on Dec. 4, 1973 to Thomas Gordan Smolka shows a safety release binding for action between a ski and a ski boot that utilizes preselected values of muscular stress of a skier for releasing the binding.

SUMMARY OF THE INVENTION

The present invention has all of the advantages of signaling devices known in the art for training or assisting a skier to maintain a proper balance on his skis, and in addition it provides several distinct and important advantages not provided by existing signaling devices. One object of the present invention is to provide a device that will indicate when there is a stress imbalance between the fronts of a pair of skis and the backs of the skis. Another object of the present invention is to provide a device capable of providing a signal based on the combined forward and backward stress imbalance for both skis or separate indications of stress imbalance for each of a pair of skis. Another object of the present invention is to provide a device that will indicate varying levels of stress imbalance in a ski or a pair of skis. Another object of the present invention is to provide a device that will indicate whether a skier is leaning forward or backward on either or both skis. Another object of the present invention is to provide a device that can be quickly and easily made ready for use by simple procedures that can be easily learned and remembered by a skier. Another object of the present invention is to provide a device that is light in weight and portable and that can be conveniently carried by a skier without hampering his skiing efforts or obscuring his view of a ski path. Another object of the present invention is to provide a device that is simple in construction; inexpensive; strong, durable, and not subject to easy breakage; reliable; and well adapted for the purposes for which it is intended. Other objects and advantages of the present invention will become apparent from a consideration of the following detailed description taken in connection with the accompanying drawings wherein a preferred embodiment of my invention is shown. It should be understood that my invention is not limited to the details disclosed, but includes all such variations and modifications as fall within the spirit of my invention and the scope of the appended claims.

The objectives of the present invention are accomplished by providing a signal device of novel construction comprising a pair of strain gauges mounted to the top surface of each of a pair of skis with one strain gauge mounted in front of each boot and the other strain gauge mounted behind each boot. The pair of strain gauges from each ski is connected by electrical conductor wires to an adjustable Wheatstone bridge circuit. The bridge circuit produces a voltage output that is proportional to the difference in stress between the fronts of the skis and the backs of the skis as measured by the four strain gauges, and the polarity of the voltage output is determined by the relative stress levels in the two portions of the skis. In an alternate embodiment of my invention I provide two bridge circuits that produce separate voltage outputs for each ski. The voltage output of each bridge circuit is amplified by operational amplifiers and used by a pair of LED drivers to sequentially illuminate two pluralities of LEDs mounted around the periphery of a pair of goggles worn by the skier. Ilumination of one or more LEDs on one side indicates to a skier that there is a stress imbalance in his skis resulting from his leaning forward, and illumination of one or more LEDs on the other side indicates that there is a stress imbalance in the skis resulting from his leaning backwards. The number of illuminated LEDs indicates the magnitude of any stress imbalance. So far as is known to the applicant, no signaling device is known in the prior art that employs ski surface stress measurements as an indication of balance or employs sequentially illuminated LEDs as signal devices for informing a skier when he is leaning forward or backward on either or both skis and the magnitude of any stress produced thereby.

BRIEF DESCRIPTION OF THE DRAWINGS

A preferred embodiment of my invention is illustrated in the accompanying drawings in which:

FIG. 3 is a schematic diagram of a Wheatstone bridge circuit used in my invention;

FIG. 4 is a schematic diagram of operational amplifiers used in my invention;

FIG. 6 is a schematic diagram of an alternate arrangement for a Wheatstone bridge circuit.

DESCRIPTION OF THE PREFERRED EMBODIMENT

Figure 1:
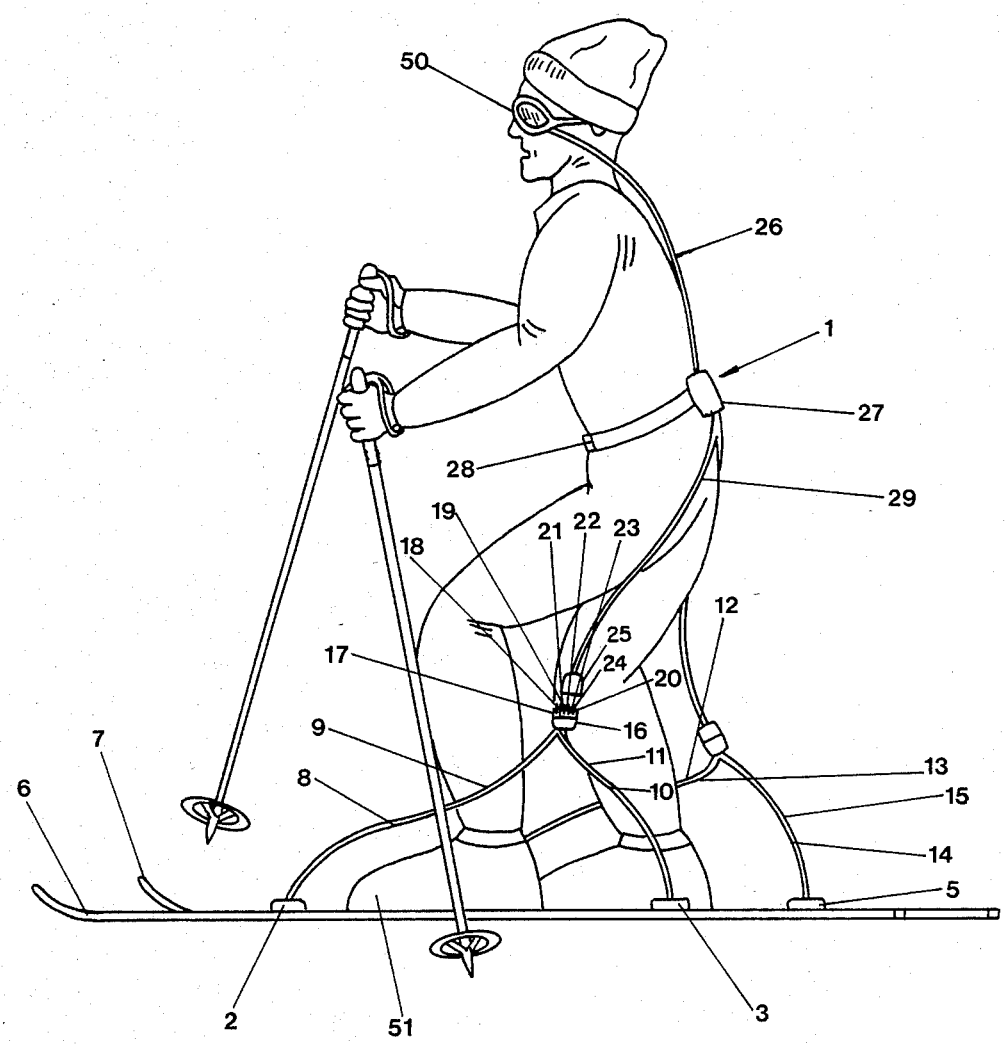
FIG. 1 depicts a skier wearing the signaling device of the present invention.

Referring now to the drawings in greater detail, FIG. 1 depicts a skier wearing the signaling device of the present invention. The signaling device 1 comprises first, second, third and fourth strain gauges 2, 3, 4, 5 mounted on a pair of skis 6, 7 and connected by electrical wires 8–15 to a plug 16 having a plurality of prongs 17–24, which plug 16 is detachably coupled to a socket 25 when the device 1 is being used. The socket 25 is electrically connected by cable means 29 to a signal processing package 27 worn on a skier's belt 28, which package comprises bridge circuits, amplifiers and drivers hereafter described in detail. The output of the signal processing package 27 is carried by electrical conductor means 26 to two plurality of LEDs 30–49 (light emitting diodes) mounted around the periphery of a pair of goggles 50.

A first strain gauge 2 is mounted on the top surface of a first ski 6 in front of a first boot 51 in such manner as to measure lengthwise strain at the top surface of the first ski 6 in front of the first boot 51. A second strain gauge 3 is mounted on the top surface on the first ski 6 behind the first boot 51 in such manner as to measure lenghtwise strain at the top surface of the first ski 6 behind the first boot 51. Third and fourth strain gauges 4, 5 are mounted in a like manner on a second ski 7. The four gauges 2, 3, 4, 5, are connected by electrical conductor wires 8–15 to the prongs 17–24 of a plug 16. A socket 25 adapted to be detachably coupled to the plug 16 is suspended by electrical cable means 29 from a signal processing package 27 worn on a skier's belt 28.

Figure 2:
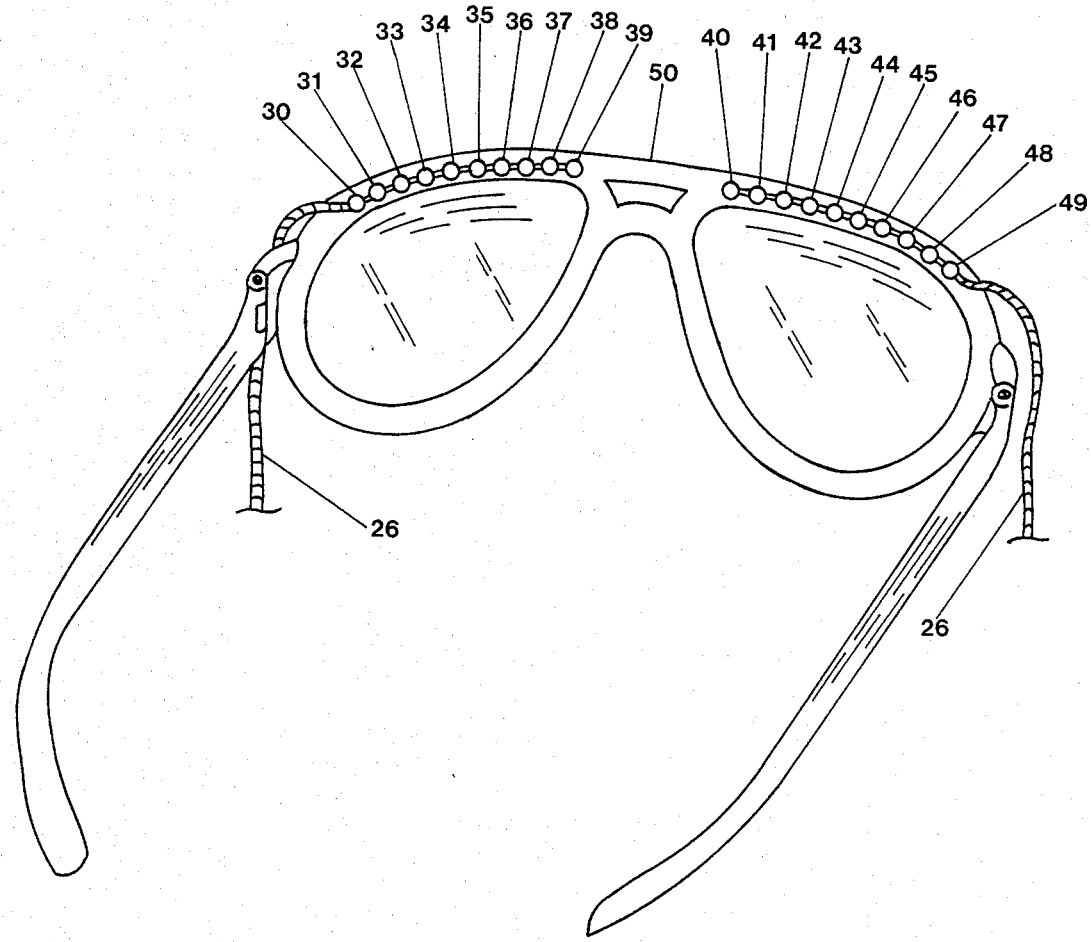
FIG. 2 is a view in perspective showing a pair of goggles with two pluralities of LEDs mounted around the periphery thereof.

FIG. 2 depicts a pair of goggles 50 having mounted around the periphery thereof two pluralities of LEDs 30–49 connected by electrical cable means 26 to the signal processing package 27 worn on the skier's belt 28. When a skier leans forward on his skis one or more of a first plurality of LEDs 30–39 is illuminated, with the number of illuminated LEDs being proportional to the amount of forward lean. When a skier leans backwards on his skis one or more of a second plurality LEDs 40–49 is illuminated with the number of illuminated LEDs being proportional to the amount of backward lean. No LED is illuminated when a skier is balanced on his skis with his weight concentrated over the center of the skis.

When initiating a turn it is desirable to lean forward on both skis. Illumination of one or more of the first plurality of LEDs 30–39 gives the skier a positive indication that forward pressure is being applied to his skis. At other times a skier's weight should be concentrated over the center of his skis, and a skier knows that he has achieved a balanced position when no LED is illuminated.

FIG. 3 is a schematic diagram of a Wheatstone bridge circuit provided in my signaling device. The bridge employs the resistances $R_1$, $R_2$, $R_3$, and $R_4$ of four strain gauges 2, 3, 4, 5 in four active arms. $R_1$ and $R_3$ symbolize the resistances of the two front strain gauges 2, 4, and $R_2$ and $R_4$ symbolize the resistances of the two back strain gauges 3, 5. The output voltage, $e_o$, of the bridge circuit is a function of a supply voltage, $E_{ex}$, and the resistances of the four strain gauges, and may be expressed as follows:

$$e_o = E_{ex}\left[\frac{R_1R_3 - R_2R_4}{(R_1 + R_4)(R_2 + R_3)}\right]$$

In a preferred embodiment of my invention I employ in the arms of my bridge circuit four like, commercially available strain gauges having nominal zero-strain electrical resistances of the magnitude of 120 ohms. I also employ a 1.0 kilohm potentiometer $R_5$ and a 1–500 ohm fixed resistor $R_6$ in the bridge to compensate for any differences in strain gauge resistances and thereby balance the bridge.

It is obvious that the front and back top surfaces of a pair of skis 6, 7 tend to be in compression when a skier is standing on them. The application of a compressive stress to any of my strain gauges causes the resistance of the gauge to increase. The numerator of the fraction in the above stated formula, and the output voltage of the bridge, will be zero any time that the product of the two front gauge resistances, $R_1$ and $R_3$, equals the product the two back gauge resistances, $R_2$ and $R_4$. Therefore, the bridge circuit will produce an output voltage only when the combined strain in the front gauges 2, 4 exceeds the combined strain in the back gauges 3, 5 or when the combined strain in the back gauges 3, 5 exceeds the combined strain in the front gauges 2, 4. The output voltage will be zero any time the combined front strains equals the combined back strains. It is also evident from an examination of the formula that the output voltage of the bridge circuit is proportional to the difference in combined front strains and combined back strains, rather than the absolute magnitudes of these combined strains. Further, when the product of $R_1$ and $R_3$ exceeds the product of $R_2$ and $R_4$, as would be the case when a skier is leaning forward, the polarity of the output voltage is positive; and when the product of $R_2$ and $R_4$ exceeds the product of $R_1$ and $R_3$, as would be the case when a skier is leaning backwards, the polarity of the output voltage is negative. Thus the Wheatstone bridge circuit is capable of producing an output voltage that is proportional to the magnitude of any stress imbalance between the front top surfaces of a pair of skis and the back top surfaces of the pair of skis as measured by strain gauges on the front and back of each ski, and the polarity of the output voltage is determined by the relative magnitudes of the front and back stresses.

I have determined by measurements that compressive stresses at the top surface of a ski may range upward from zero to in excess of one thousand (1,000) p.s.i. and that such stresses will produce strains ranging upward from zero to in excess of $2.550 \times 10^{-4}$ inches per inch. In the described embodiment of my invention I provide a 9-volt DC power supply, and I have determined that for such a bridge the output voltages range from zero to approximately 2.50 millivolts for the levels of stress and strain just cited. The bridge circuit output voltage is therefore too low to operate the pluralities of LEDs mounted in the goggles without first being amplified.

FIG. 4 is a schematic diagram of an amplifier circuit used in my signaling device. The circuit comprises first, second and third differential amplifiers, $A_1$, $A_2$, $A_3$, each having a 1.0 kilohm input resistor, $R_8$, $R_9$, $R_{10}$. The first and second differential amplifiers are each provided with a 1.0 megohm variable feedback resistor $R_{11}$, $R_{12}$, and the third differential amplifier $A_3$, which serves as an inverter is provided with 1.0 kilohm feedback resistor $R_{13}$. The first and third differential amplifies $A_1$, $A_3$ are each provided with a 1.0 kilohm current limiting resistor $R_{14}$, $R_{15}$. Clamping diodes $D_1$, $D_2$ clamp the outputs of the amplifiers to ground. When a skier leans forward an output voltage will appear at "X", and when a skier leans backward an output voltage will appear at "Y". A voltage appearing at "X" or "Y" is applied to the input of one of two LED driver circuits, hereinafter described, to control the illumination of one of two pluralities of LEDs mounted in the goggles. In a preferred embodiment of my invention I employ commercially available operational amplifiers such, for example, as quad-operational amplifier #LM324N by Archer ®. The purpose of the operational amplifiers is to provide 0–5 VDC signal sources for the LED drivers.

Figure 5:
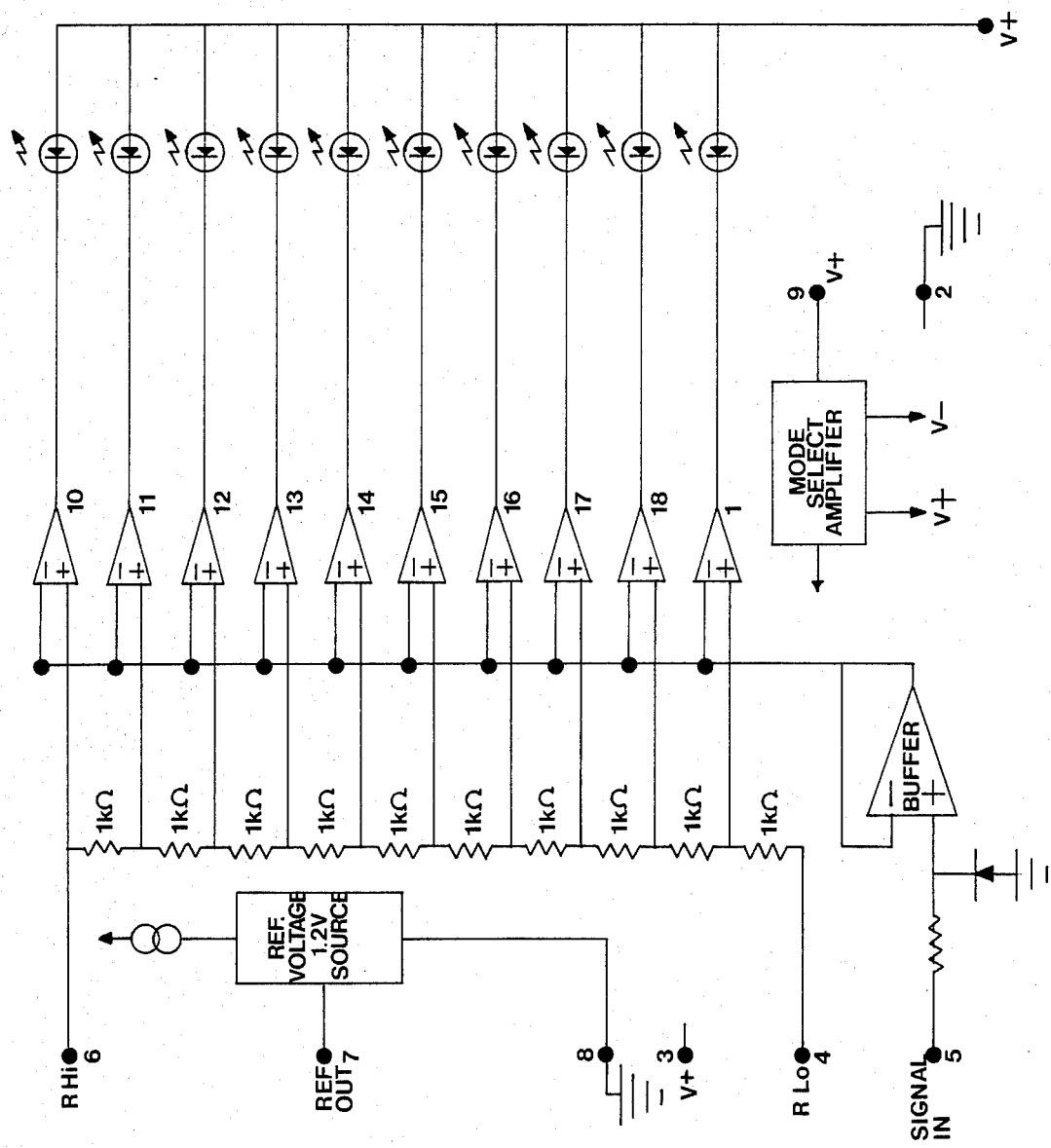
FIG. 5 is a schematic diagram of LED drivers and LED circuits used in my invention.

FIG. 5 is the schematic diagram for the wiring of a commercially available LED driver such, for example, as #LM3914N by Archer ®. The 18-pin LED driver comprises a voltage divider network having a high end that is accessible at pin 6 and a low end that is accessible at pin 4. A 9 VDC power source is provided between pins 2 and 3 as shown. An internal reference voltage source provides reference voltages to a plurality of comparators. The magnitude of the reference voltage for each comparator is determined by the point within the voltage divider network where the reference voltage is obtained for the comparator. The internally generated reference voltage is available at pin 7. Externally connected resistor means may be employed between pins 7 and 8 for adjusting the internal reference voltage. The output of an operational amplifier is coupled to pin 5 of an LED driver. In the illustrated embodiment ten comparators are provided having outputs accessible at pins 10, 11, 12, 13, 14, 15, 16, 17, 18, and 1 respectively. The output of each comparator is coupled to an LED as shown. An internal mode selector amplifier, which is accessible at pin 9, allows for two modes of operation. A first mode provides for the sequential illumination of a plurality of LEDs as the input voltage increases, but each previously illuminated LED is extinguished when the next LED is illuminated so that only one LED is illuminated at any given time. A second mode provides for the sequential illumination of a plurality of LEDs as the input voltage increases, but no LED is extinguished so long as the input voltage is equal to or greater than the threshold voltage required to illuminate the LED in the first instance. Further description of the LED driver is not deemed necessary since the driver is commercially available in prepackaged form.

When a skier leans forward the Wheatstone bridge circuit produces an output voltage that is amplified in a first differential amplifier and fed to a first LED driver to control the illumination of a first plurality of LEDs in a pair of goggles. When a skier leans backwards the Wheatstone bridge circuit produces an output voltage of the opposite polarity that is amplified in a second differential amplifier, inverted, and fed to a second LED driver to control the illumination of a second plurality of LEDs in the pair of goggles.

FIG. 6 is a schematic diagram of an alternate embodiment of my Wheatstone bridge circuit having two active arms and two passive arms. The bridge employs in two adjacent active arms the resistances $R_{63}$, $R_{64}$ of two strain gauges mounted on the front and back surfaces respectively of a ski. Two fixed and equal resistances $R_{61}$, $R_{62}$ are employed in two passive arms. Bridge balancing resistors $R_{65}$, $R_{66}$ are also provided. The strain gauges used in the alternate embodiment may be the same as those used in the first-described embodiment, and I employ in the passive arms resistors $R_{61}$, $R_{62}$ having nominal fixed resistance values equal to the nominal zero-strain resistance values of the strain gauges.

The numerator in the fraction in the above stated formula for the output voltage of a Wheatstone bridge circuit will be zero any time the gauge resistances $R_{63}$, $R_{64}$ are of equal magnitude. Therefore the bridge circuit will produce an output voltage only when there is a difference between the stress being measured at the front of a ski and the stress being measured at the back of the ski, and anytime that the stresses at the front and back of a ski are equal there will be no output voltage. The output of the alternate Wheatstone bridge circuit is amplified and used by a pair of LED drivers to operate two pluralities of LEDs in one side of a pair of goggles in the manner described above for the first-described embodiment. It will be readily seen that the purpose and function of the alternate embodiment is the same as for the first-described embodiment, except that in the alternate embodiment the output of a bridge circuit is determined by the stress conditions in one ski only. By employing two strain gauges and a Wheatstone bridge circuit with its associated amplifiers, drivers and LEDs for each ski, I am able to control the illumination of four pluralities of LEDs, two of which indicate forward and backward lean for one ski, and two of which indicate forward and backward lean for the other ski.

It will be readily seen that signal devices other than LEDs such, for example, as audio output devices could be employed within the scope of my present invention. The output of the operational amplifiers could be used to drive a commercially available sound synthesizer chip to produce tones in which the pitch would be dependent upon the polarity of the output voltage and also proportional to the magnitude of the output voltage.

Since potentiometers are used for the differential amplifier feedback resistors $R_{11}$, $R_{12}$ a user may vary the gain to accomodate different terrains, different skier weights, and different skiing styles.

A belt mounted switch could allow a skier to switch from one of the described modes of operation to the other.

Also, a belt mounted switch could allow a skier to add forward and reverse stresses, rather than substract them, to obtain an indication of the total strain in his skis rather than an indication of the difference between the front and back strains.

Having thus described my invention, what I now claim is:

1. A ski stress signaling device comprising a plurality of strain gauges mounted on the top surfaces of a pair of skis and adapted to measure lengthwise strains in the said top surfaces of the said pair of skis; a plurality of electrical conductor wires adapted to connect the said plurality of strain gauges to form a Wheatstone bridge circuit; resistance compensation means adapted to compensate for any differences in the magnitudes of zero-stress resistances of the strain gauges of the said plurality of strain gauges; electrical conductor means adapted for connecting a direct current power supply to the said Wheatstone bridge circuit; first and second bridge output means;

a first amplifier means adapted to be connected to a direct current power source and adapted to amplify an output voltage of the said Wheatstone bridge circuit;

a second amplifier means adapted to be connected to a direct current power source and adapted to amplify an output voltage of the said Wheatstone bridge circuit;

a third amplifier means adapted to invert an output voltage of the said second amplifier means;

a first light emitting diode driver circuit adapted to be driven by an output voltage of the said first amplifier means and having a plurality of output means and adapted to be connected to a direct current power source wherein each of the said output means of the said plurality of output means is connected by electrical conductor means to an anode of a light emitting diode of a first plurality of light emitting diodes each having a cathode that is connected by electrical conductor means to a direct current power source;

a second light emitting diode driver circuit adapted to be driven by an output voltage of the said third amplifier means and having a plurality of output means and adapted to be connected to a direct current power and wherein each of the output means of the said plurality of output means is connected by electrical conductor means to an anode of a light emitting diode of a second plurality of light emitting diodes each having a cathode that is connected by electrical conductor means to a direct current power source;

a plurality of direct current power sources adapted to operate the aforesaid Wheatstone bridge circuit, the said first, second and third amplifier means, the said first and second light emitting diode driver circuits, and the said first and second pluralities of light emitting diodes; and a pair of goggles having mounted on a first portion of the perimeter thereof the said first plurality of light emitting diodes and having mounted on a second portion of the perimeter thereof the said second plurality of light emitting diodes.

2. A ski stress signaling device comprising first, second, third and fourth strain gauges wherein the said first strain gauge is mounted on a front portion of a top surface of a first ski and is adapted to measure lengthwise strain in the said front portion of the said top surface of the said first ski, and wherein the said second strain gauge is mounted on a back portion of the top surface of the said first ski and is adapted to measure lengthwise strain in the said back portion of the said top surface of the said first ski, and wherein the said third strain gauge is mounted on a front portion of a top surface of a second ski and is adapted to measure lengthwise strain in the said front portion of the said top surface of the said second ski, and wherein the said fourth strain gauge is mounted on a back portion of the top surface of the said second ski and is adapted to measure lengthwise strain in the said back portion of the said top surface of the said second ski; a plurality of electrical conductor means adapted to connect a first side of the said first strain gauge to a first side of the said second strain gauge and a second side of the said second strain gauge to a first side of the said fourth strain gauge and a second side of the said fourth strain gauge to a first side of the said third strain gauge and a second side of the said third strain guage to a second side of the said first strain gauge to form a Wheatstone bridge circuit; a first resistance compensation resistor comprising a potentiometer having a movable contact and connected on a first side by electrical conductor means to the said second side of the said fourth strain gauge and to the said first side of the said third strain gauge and connected on a second side by electrical conductor means to the said first side of the said second strain gauge and to the said first side of the said first strain gauge and a second resistance compensation resistor connected on a first side by electrial conductor means to the said movable contact of the said first resistance compensation resistor and connected on a second side to the said second side of the said first strain gauge and the said second side of the said third strain gauge; electrical conductor means adapted for connecting one side of a direct current power supply to the said second side of the said fourth strain gauge and to the said first side of the said third strain gauge and to the said first side of the said first resistance compensation resistor and electrical conductor means adapted for connecting a second side of the said direct current power supply to the said first side of the said first strain gauge and to the said first side of the said second strain gauge and to the said second side of the said first resistance compensation resistor; a first bridge output means comprising an electrical conductor connected at one end to the said second side of the said third strain gauge and the said second side of the said first strain gauge and the said second side of the said second resistance compensation resistor; a second bridge output means comprising an electrical conductor connected at one end to the said second side of the said second strain gauge and the said first side of the said fourth strain gauge;

a first differential amplifier having first and second input connection means and an output connection means and adapted to be connected by electrical conductor means to a direct current power source wherein the said first input connection means is connected by electrical conductor means to a first side of a first input resistor that is connected on a second side to the aforesaid first bridge output means and wherein the said second input connection means is grounded; a first current limiting resistor connected on a first side by electrical conductor means to the said output connection means of the said first differential amplifier and connected on a second side by electrical conductor means to an anode of a first clamping diode having a cathode that is grounded; a first variable feedback resistor connected on a first side by electrical conductor means to the said first input connection means of the said first differential amplifier and connected on a second side by electrical conductor means to the said output connection means of the said first differential amplifier;

a second differential amplifier having first and second input connection means and an output connection means and adapted to be connected by electrical conductor means to a direct current power source wherein the said first input connection means is connected by electrical conductor means to a first side of a second input resistor that is connected on a second side to the aforesaid second bridge output means and wherein the said second input connection means is grounded; a second variable feedback resistor connected on a first side by electrical conductor means to the said first input connection means of the said second differential amplifier and connected on a second side by electrical conductor means to the said output connection means of the said second differential amplifier;

a third differential amplifier adapted to serve as an inverter and having first and second input connection means and an output connection means and adapted to be connected by electrical conductor means to a direct current power source wherein the said first input connection means is connected by electrical conductor means to a first side of a third input resistor that is connected on a second side by electrical conductor means to the said output connection means of the said second differential amplifier and wherein the said second input connection means is grounded; a second current limiting resistor connected on a first side by electrical conductor means to the said output connection means of the said third differential amplifier and connected on a second side by electrical conductor means to an anode of a second clamping diode having a cathode that is grounded; a third feedback resistor connected on a first side by electrical conductor means to the said first input connection means of the said third differential amplifier and connected on a second side by electrical conductor means to the said output connection means of the said third differential amplifier;

a first light emitting diode driver circuit having an input connection means and a plurality of output means and adapted to be connected by electrical conductor means to a direct current power source wherein the said input connection means is connected by electrical conductor means to the aforesaid second side of the said first current limiting resistor and the said anode of the said first clamping diode and wherein each of the output means of the said plurality of output means is connected by electrical conductor means to an anode of a light emitting diode of a first plurality of light emitting diodes each having a cathode that is connected by electrical conductor means to a direct current power source;

a second light emitting diode driver circuit having an input connection means and a plurality of output means and adapted to be connected by electrical conductor means to a direct current power source wherein the said input connection means is connected by electrical conductor means to the aforesaid second side of the said second current limiting resistor and the said anode of the said second clamping diode and wherein each of the output means of the said plurality of output means is connected by electrical conductor means to an anode of a light emitting diode of a second plurality of light emitting diodes each having a cathode that is connected by electrical conductor means to a direct current power source;

a plurality of direct current power sources adapted to operate the aforesaid Wheatstone bridge circuit, the said first, second and third differential amplifiers, the said first and second light emitting diode driver circuits, and the said first and second pluralities of light emitting diodes; and a pair of goggles having mounted on the perimeter of one side thereof the said first plurality of light emitting diodes and having mounted on the perimeter of the other side thereof the said second plurality of light emitting diodes.

3. A ski stress signaling device comprising first and second strain gauges wherein the said first strain gauge is mounted on a front portion of a top surface of a ski and is adapted to measure lengthwise strain in the said front portion of the said top surface of the said ski, and wherein the said second strain gauge is mounted on a back portion of a top surface of the said ski and is adapted to measure lengthwise strain in the said back portion of the said top surface of the said ski; a plurality of electrical conductor means adapted to connect a first side of the said first strain gauge to a first side of the said second strain gauge and a second side of the said first strain gauge to a first side of a first fixed resistor and a second side of the said first fixed resistor to a first side of a second fixed resistor and a second side of the said second fixed resistor to a second side of the said second strain gauge to form a Wheatstone bridge circuit; a first resistance compensation resistor comprising a potentiometer having a movable contact having a first side connected by electrical conductor means to the said first side of the said first strain gauge and to the said first side of the said second strain gauge and connected on a second side by electrical conductor means to the said first side of the said second fixed resistor and to the said second side of the said first fixed resistor and a second resistance compensation resistor connected on a first side by electrical conductor means to the said movable contact of the said first resistance compensation resistor and connected on a second side to the said second side of the said first strain gauge and to the said first side of the said first fixed resistor; electrical conductor means adapted for connecting one side of a direct current power supply to the said first side of the said first strain gauge and the said first side of the said second strain gauge and to the said first side of the said first resistance compensation resistor and electrical conductor means adapted for connecting a second side of the said direct current power supply to the said second side of the said first fixed resistor and the said first side of the said second fixed resistor and to the said second side of the said first resistance compensation resistor; a first bridge output means comprising an electrical conductor connected at one end to the said second side of the said first strain gauge and the said first side of the said first fixed resistor and the said second side of the said second resistance compensation resistor; a second bridge output means comprising an electrical conductor connected at one end to the said second side of the said second fixed resistor and the said second side of the said second strain gauge;

a first differential amplifier having first and second input connection means and an output connection means and adapted to be connected by electrical conductor means to a direct current power source wherein the said first input connection means is connected by electrical conductor means to a first side of a first input resistor that is connected on a second side to the aforesaid first bridge output means and wherein the said second input connection means is grounded; a first current limiting resistor connected on a first side by electrical conductor means to the said output connection means of the said first differential amplifier and connected on a second side by electrical conductor means to an anode of a first clamping diode having a cathode that is grounded; a first variable feedback resistor connected on a first side by electrical conductor means to the said first input connection means of the said first differential amplifier and connected on a second side by electrical conductor means to the said output connection means of the said first differential amplifier;

a second differential amplifier having first and second input connection means and an output connection means and adapted to be connected by electrical conductor means to a direct current power source wherein the said first input connection means is connected by electrical conductor means to a first side of a second input resistor that is connected on a second side to the aforesaid second bridge output means and wherein the said second input connection means is grounded; a second variable feedback resistor connected on a first side by electrical conductor means to the said first input connection means of the said second differential amplifier and connected on a second side by electrical conductor means to the said output connection means of the said second differential amplifier;

a third differential amplifier adapted to serve as an inverter and having first and second input connection means and an output connection means and adapted to be connected by electrical conductor means to a direct current power source wherein the said first input connection means is connected by electrical conductor means to a first side of a third input resistor that is connected on a second side by electrical conductor means to the said output connection means of the said second differential amplifier and wherein the said second input connection means is grounded; a second current limiting resistor connected on a first side by electrical conductor means to the said output connection means of the said third differential amplifier and connected on a second side by electrical conductor means to an anode of a second clamping diode having a cathode that is grounded; a third feedback resistor connected on a first side by electrical conductor means to the said first input connection means of the said third differential amplifier and connected on a second side by electrical conductor means to the said output connection means of the said third differential amplifier;

a first light emitting diode driver circuit having an input connection means and a plurality of output means and adapted to be connected by electrical conductor means to a direct current power source wherein the said input connection means is connected by electrical conductor means to the aforesaid second side of the said first current limiting resistor and the said anode of the said first clamping diode and wherein each of the output means of the said plurality of output means is connected by electrical conductor means to an anode of a light emitting diode of a first plurality of light emitting diodes each having a cathode that is connected by electrical conductor means to a direct current power source;

a second light emitting diode driver circuit having an input connection means and a plurality of output means and adapted to be connected by electrical conductor means to a direct current power source wherein the said input connection means is connected by electrical conductor means to the aforesaid second side of the said second current limiting resistor and the said anode of the said second clamping diode and wherein each of the output means of the said plurality of output means is connected by electrical conductor means to an anode of a light emitting diode of a second plurality of light emitting diodes each having a cathode that is connected by electrical conductor means to a direct current power source;

a plurality of direct current power sources adapted to operate the aforesaid Wheatstone bridge circuit, the said first, second and third differential amplifiers, the said first and second light emitting diode driver circuits, and the said first and second pluralities of light emitting diodes; and a pair of goggles having mounted on a portion of the perimeter of one side thereof the said first plurality of light emitting diodes and having mounted on another portion the perimeter of the said side the said second plurality of light emitting diodes.

* * * * *